July 28, 1953 — W. W. KRAFT — 2,646,977
VAPOR LIQUID CONTACT APPARATUS
Filed March 21, 1951

INVENTOR
Wheaton W. Kraft
BY Nathaniel Ely
ATTORNEY

Patented July 28, 1953

2,646,977

UNITED STATES PATENT OFFICE 2,646,977

VAPOR LIQUID CONTACT APPARATUS

Wheaton W. Kraft, Scarsdale, N. Y., assignor to The Lummus Company, New York, N. Y., a corporation of Delaware Application March 21, 1951, Serial No. 216,782

14 Claims. (Cl. 261—114)

This invention relates to vapor-liquid contact apparatus and, more particularly, to a unique downcomer structure which is most advantageously used in combination with double cross-flow decks in large diameter towers.

It is generally recognized that the flowing liquid gradient across a fractionating column deck increases as the diameter of the tower increases because of the length of the liquid travel. The effect of this gradient is to permit uneven vapor flow through the decks because of the unequal liquid head on opposite sides of the deck which becomes more noticeable as tower diameters reach eight feet and greater. This effect is generally compensated for by the use of cross-flow decks with two or more parallel flowing liquid streams.

In a double cross-flow deck, the liquid discharged on an upper deck will flow from the center to the sides, and thence to downcomers which carry the liquid to the next lower deck. On this lower deck, the flow is from the sides to the center again and the pattern is repeated. It will thus be appreciated that the liquid generally flows only halfway across the diameter of the column at any one deck level. Notwithstanding this relatively short flow, it is often found that there is unequal liquid distribution resulting from out-of-plumb towers or inaccurately leveled decks especially in the vertical plane transverse to the direction of liquid flow. Inaccuracies in this plane are particularly common due to the difficulties of supporting the free edges of the deck and any inaccuracy will tend to concentrate the flow of liquid down one side of the tower. Ultimately a stage is reached at which the liquid gradient is insufficient to restrict vapor flow and the blow through results in an inefficient and imperfect contact.

The principal object of my invention is to provide an improved deck and downcomer construction for large liquid vapor contact towers by which unequal liquid flow on cross-flow decks is avoided, whereby uniform vapor contact is accomplished, and blow-through is prevented.

Further objects and advantages of my invention will be apparent to those skilled in the art on a consideration of the following specification and accompanying drawing in which.

Figure 1:
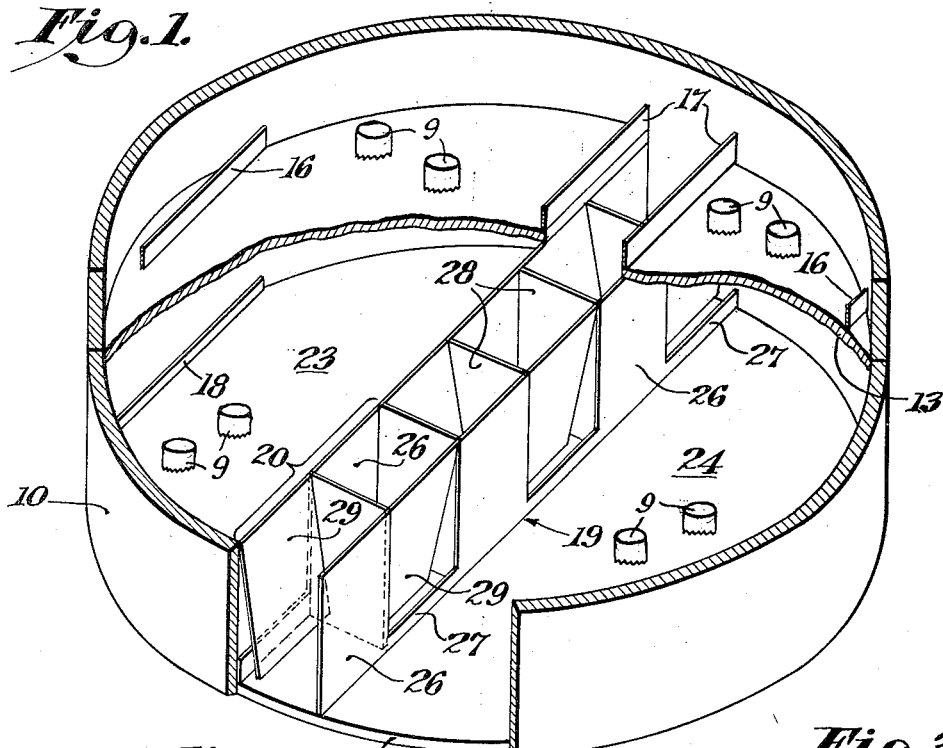
Fig. 1 is a perspective view with parts in section of a portion of a contact tower having a downcomer constructed in accordance with my invention.
Figure 2:
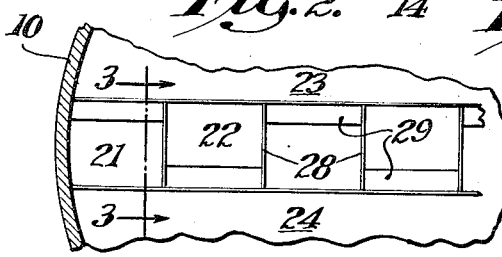
Fig. 2 is a plan view of a portion of Fig. 1.

Figs. 1-4 inclusive show a double cross-flow deck construction for a tower or column 10 in which decks 12, 13, and 14 only are described. The top deck 12 is adapted to receive reflux liquid from the conduit 15 and the liquid will flow each way from the center and over the weirs 18 and through the downcomers 18a to the deck 13 below.

The deck 13 is provided with weirs 16 which extend above the lower extremity of the downcomer 18a to form a liquid trap, and from which the liquid will flow to the center, and thence through the downcomer 19 to the deck 14 below. It will be understood that the deck 14 is a duplicate of the deck 12 and that below the deck 14 there will be other decks such as 13 with the various pairs extending through the tower. It is also to be understood that the decks may bear a plurality of bubble caps 9 or other contacting means thereon.

My invention relates particularly to the downcomer construction 19 which, as more particularly shown in Fig. 1, consists of a plurality of pairs 20 of chutes or conduits 21 and 22 (see Fig. 2) which extend along the median line of the tower.

Figure 3:
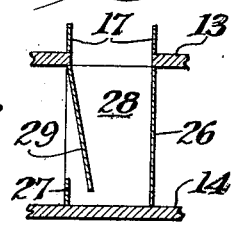
Fig. 3 is a vertical section taken along line 3—3 of Fig. 2.
Figure 4:
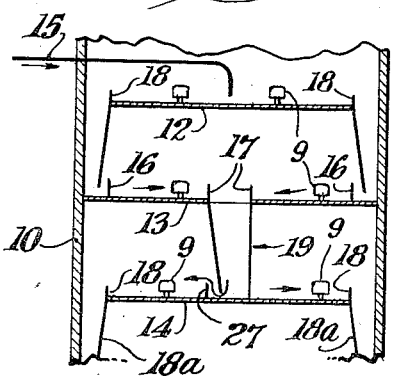
Fig. 4 is a vertical central section through a tower such as shown in Fig. 1.

With particular reference to the first pair of conduits, it will be apparent from inspection of Figs. 1 and 3 that a conduit or downcomer is defined by a pair of opposed upwardly extending walls 26 and 27, the wall 26 extending fully between the decks 13 and 14 and being in liquid tight communication therewith. The wall 27 extends only a short distance upwardly from the lower deck 14 and serves as a weir. This wall is completed by inwardly inclined downcomer plate 29 extending from the upper deck 13 downwardly and inwardly to a point slightly below the top of the weir wall 27 to serve as a liquid trap. The end walls of the chute forming spaced transverse partitions are indicated at 28, and they, too, extend from the deck 13 to the bottom deck 14 to both of which they are secured.

The deck 13 is also provided with weirs 17 adjacent the downcomer chutes 19, such weirs cooperating with the weirs 16 first mentioned, to establish a liquid head on the deck sufficient to cover the customary bubble caps or other liquid contact devices.

With the foregoing construction, it will be apparent that the initial liquid flow onto deck 12, which was distributed substantially uniformly by weirs 18 and downcomers 18a to the wall sides of deck 13 and thence to the center of deck 13 and over the weirs 17, will pass down the various chutes 21, 22, etc. Inasmuch as each pair of chutes is provided with an offset wall 29, and each wall in an adjacent chute is disposed to a different side of the deck below, the liquid flow from deck 13 will be alternately distributed to opposite sides of deck 14 below. Generally, I prefer to use a substantial number of chutes, at least three pairs being shown, to accomplish complete redistribution of the liquid.

If it were found that the tower 10 is somewhat out-of-plumb, or if any of the decks are out of level, any tendency of the liquid to gravitate toward the lower side of a deck is immediately counteracted at the next deck, for at least half of all the fluid on the low side will be discharged to the high side. Such an arrangement immediately counteracts prior difficulties resulting from the tendency of the liquid to so concentrate on the lower side of every deck until ultimately there was no liquid gradient which would prevent blow-through. In this construction, this redistribution occurs on every other deck, and it is independent of the level on any portion of the deck for the alternate arrangement of chutes will deliver one half of whatever liquid there is at any point to the respective portions 23 and 24 of the deck below.

This type of chute construction also has some value as a beam in that the respective decks and the transverse partitions 28 constitute beam elements which aid in reinforcing the tower.

Figure 5:
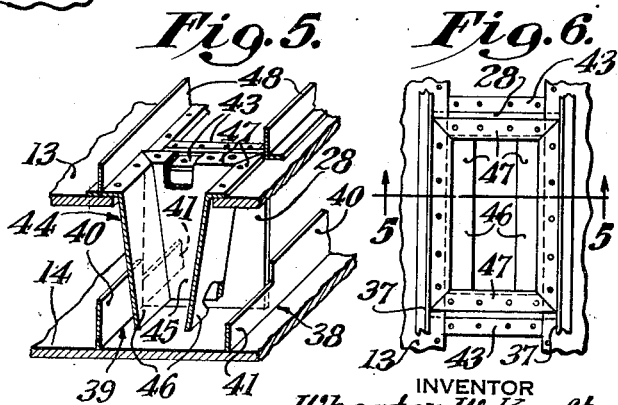
Figs. 5 and 6 show perspective and plan views, respectively, of a different form of embodiment of this invention.
Figure 6:
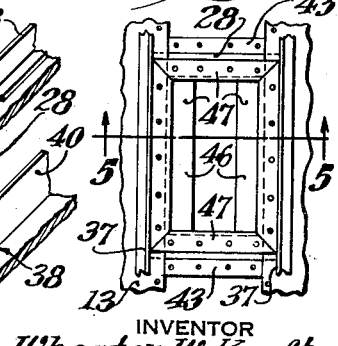

A modified form of construction is shown in Figs. 5 and 6 in which the deck 13 is apertured to form a plurality of downcomer openings extending across the tower. At the desired intervals, transverse partitions 28 are integrated to the respective decks to form the transverse beam of substantial strength. The weir plates 38 and 39 which are attached to the lower deck 14 and to these partitions 28 also aid in this beam strength. The weir plates have alternate high sections 40 and low sections 41 with a high section of one extending between plates 28 being opposite the low section 41 of the opposite weir. In this construction the downcomer unit 44 is a separate detachable element, such element including a pair of vertical end wall plates 45 and a pair of inwardly inclined side wall plates 46. The upper extremity of these plates may be flanged to form a lip, or ledge, which rests on the deck 13 and on suitable filler strips 43 on top of the transverse plates 28 in such a manner that each downcomer unit may be made liquid tight. Weirs 48 extend along the uppermost edge of the chute construction to maintain the liquid level in the usual manner.

This construction, which has the advantage of manufacturing flexibility, will operate in the same manner as the construction of Fig. 1. The liquid on an upper deck will be distributed to the sides of the lower deck to which it then flows to the center. As the liquid flows over the weirs 48, it will flow downward through the various downcomers, and by means of the alternate high and low weir portions 40 and 41, the discharge will be from the downcomer chutes to opposite deck sections of the deck below. Complete redistribution of liquid is thus effected.

Figure 7:
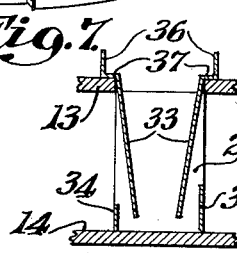
Fig. 7 shows another form of embodiment of the invention having individually removable downcomers and weir plates.

A still further modified form of embodiment of my invention is shown in Fig. 7.

In this construction, the downcomer plates 33 are detachable from the deck 13 and are provided with integral offset portions, being again offset and upstanding to form the weirs 36. The lower deck 14 is provided with high weirs 35 and low weirs 34 which serve the same purpose as the weir portions 40 and 41 heretofore described. In this form of embodiment of my invention, the downcomer plates 33 form the desired chute arrangement, and may be identical in construction, and of one piece of metal, and thus are the simplest structure for the desired purpose.

While I have shown and described preferred forms of embodiment of my invention, I am aware that modifications may be made thereto within the scope and spirit and descriptions herein, and of the claims appended hereinafter.

Having thus described my invention, what I claim is:

1. In combination with a distillation tower wherein liquid on alternate decks flows inwardly toward a central downcomer on an upper deck and outwardly away from said downcomer and away from the center of the next lower deck, a downcomer which comprises central weir means on an upper deck to maintain an independent liquid level on each side of the center thereof, a downcomer passageway between said weir means and extending from said upper deck to the next lower deck, first dividing means in said downcomer passageway and extending thereacross for dividing same into a plurality of portions whereby liquid from each side of said upper deck is divided into a plurality of streams, second dividing means between said first dividing means for dividing said portions into first and second conduits, means for directing the flow of liquid from said first conduits to one side of said lower deck, and means for directing the flow of liquid from said second conduits to the opposite side of said lower deck.

2. A downcomer as claimed in claim 1 wherein the first and second conduits of each portion are of equal horizontal cross-sectional area.

3. In combination with a distillation tower wherein liquid on alternate decks flows inwardly toward a central downcomer on an upper deck and outwardly away from said downcomer and away from the center of the next lower deck, a downcomer which comprises centrally located weir means on said upper deck to maintain independent levels of liquid on each side of the center thereof, a downcomer passageway between said weir means and extending from said upper deck to said lower deck, vertically extending first dividing means in said downcomer passageway extending thereacross from one side to the other of said upper deck and forming separate portions in said passageway whereby liquid from either side of said upper deck is divided into a plurality of streams, second dividing means parallel to said first dividing means for dividing said portions into equal first and second conduits, means for directing the flow of liquid from said first conduits to one side of said lower deck, and means for directing the flow of liquid from said second conduits to the opposite side of said lower deck.

4. In a distillation tower wherein liquid on alternate decks flows inwardly toward a central downcomer on an upper deck and outwardly away from said downcomer and the center of the next lower deck, said upper deck including two substantially semi-circular halves separated from each other at the center whereby a substantially rectangular shaped area is formed, bounded by the opposed, parallel, inner edges of said upper deck, a downcomer which comprises a plurality of first partitions extending between said edges in a plane substantially perpendicular thereto and downwardly to said lower deck, in liquid-tight communication with said lower deck, and forming a passageway, a plurality of second partitions substantially parallel to said first partitions and in liquid-tight communication with said lower deck, said second partitions forming first and second conduits within the confines of said passageway, a pair of skirts in each conduit downwardly descending from each of said opposed edges within the confines of said first and second conduits and extending to a point adjacent to said lower deck, and opposed walls in liquid-tight communication with said lower deck and said first and second partitions, bounding said zone on the opposed straight sides thereof on said lower deck, said walls having alternate high and low portions, the low portions extending above the lower ends of said skirts, the high portion extending above the low portions, the high portion of one wall being opposed to the low portion of the opposing wall.

5. A downcomer section for use in cooperation with similar sections in a large diameter distillation tower which comprises liquid-tight front and rear walls, a low weir joining the lower ends of corresponding vertically-extending edges of said walls and in liquid-tight communication therewith, a high weir joining said walls at the lower ends of vertically-extending edges opposite from said first mentioned edges, said high weir being opposed to said low weir, and a pair of opposed downcomer skirts each extending downwardly within the confines of said weirs, each of said skirts being in liquid-tight communication with said walls and extending from said front wall to said rear wall, the lower edge of said skirts being below the upper edge of said lower weir.

6. A downcomer section as claimed in claim 5 wherein said skirts are extended upwardly to a point above the upper edge of said walls thereby forming a weir.

7. A downcomer section as claimed in claim 5 wherein an extension on each of said skirts extends laterally from a point immediately above the upper edge of said walls, said extension of each skirt being in a direction away from the upper edge of the other skirt, and being adapted to fit into liquid-tight communication with a center downflow deck of a large distillation tower.

8. A downcomer section as claimed in claim 7 wherein an upwardly extending weir is mounted on the outer edge of each of said lateral extensions.

9. A downcomer section for use with similar sections in a large diameter distillation tower which comprises liquid-tight front and rear walls, a pair of opposed downcomer skirts extending downwardly and joining said walls in liquid-tight communication therewith to form an enclosure of quadrilateral cross-section, said skirts being closer together at the lower extremities than at the upper extremities thereof, and a laterally outwardly extending flange at the upper end of said skirts and said walls.

10. A downcomer section as claimed in claim 9 wherein an upwardly extending weir is mounted on the outer edge of each of said lateral flanges.

11. A downcomer section as claimed in claim 9 wherein each of said walls is of substantially equilateral trapezoidal shape.

12. In a large diameter distillation tower, an upper deck of a pair of decks, said upper deck including two substantially semi-circular halves separated at the center thereof whereby a substantially rectangular shaped area is formed bounded by the opposed, parallel, inner edges of said upper deck, a lower deck of a pair of decks, first and second weirs on said upper deck, one on either side of the substantially rectangular area adjacent to said edge on said upper deck, a first weir on said lower deck in liquid-tight communication therewith and substantially under a first weir on said upper deck, said first weir on said lower deck having alternate high and low portions, a second weir on said lower deck in liquid-tight communication therewith substantially under a second weir on said upper deck, said second weir on said lower deck having alternate high and low portions, the high portions of said first weir being opposed to the low portions of said second weir, and a plurality of partitions in liquid-tight communication with said first weir at the junction of a high and a low portion of said first weir and the junction of a low and a high portion of said second weir, and said partitions extending upwardly to said upper deck.

13. In combination with a distillation tower wherein liquid on alternate decks flows inwardly toward a central downcomer on an upper deck and outwardly away from said downcomer and away from the center of the next lower deck, a downcomer which comprises centrally located weir means on an upper deck to maintain independent levels of liquid on each side of said centrally located weir means, a downcomer passageway between said weir means extending from said upper deck to the next lower deck, first dividing means in said downcomer passageway and extending thereacross for dividing same into a plurality of portions whereby liquid from each side of said upper deck is divided into a plurality of streams, second dividing means between first dividing means for dividing said portions into first and second conduits, a single skirt in said first conduit to direct the flow of liquid from said first conduit to one side of said lower deck, a single skirt in said second conduit to direct the flow of liquid from said second conduit to the opposite side of said lower deck.

14. A downcomer as claimed in claim 13 wherein the first and second conduits of each portion are of equal horizontal cross-sectional area.

WHEATON W. KRAFT.

References Cited in the file of this patent

UNITED STATES PATENTS

| Number | Name | Date |
| --- | --- | --- |
| 1,738,870 | Cox et al. | Dec. 10, 1929 |
| 1,811,247 | Smith | June 23, 1931 |
| 1,938,247 | Collins | Dec. 5, 1933 |
| 2,202,071 | Van Dongen et al. | May 28, 1940 |
| 2,366,958 | Dennis | Jan. 9, 1945 |
| 2,558,222 | Parkinson | June 26, 1951 |